(12) United States Patent
Tsubouchi

(10) Patent No.: US 12,490,969 B2
(45) Date of Patent: Dec. 9, 2025

(54) STABILIZER TOOL FOR TOTAL ENDOSCOPIC CORONARY ARTERY BYPASS

(71) Applicant: Terumo Cardiovascular Systems Corporation, Ann Arbor, MI (US)

(72) Inventor: Takeshi Tsubouchi, Dexter, MI (US)

(73) Assignee: Terumo Cardiovascular Systems Corporation, Ann Arbor, MI (US)

( * ) Notice: Subject to any disclaimer, the term of this patent is extended or adjusted under 35 U.S.C. 154(b) by 230 days.

(21) Appl. No.: 18/035,886

(22) PCT Filed: Nov. 3, 2021

(86) PCT No.: PCT/US2021/057833
§ 371 (c)(1),
(2) Date: May 8, 2023

(87) PCT Pub. No.: WO2022/098708
PCT Pub. Date: May 12, 2022

(65) Prior Publication Data
US 2023/0414212 A1 Dec. 28, 2023

Related U.S. Application Data

(60) Provisional application No. 63/182,149, filed on Apr. 30, 2021, provisional application No. 63/111,222, filed on Nov. 9, 2020.

(51) Int. Cl.
*A61B 17/02* (2006.01)
*A61B 17/30* (2006.01)
*A61B 17/00* (2006.01)

(52) U.S. Cl.
CPC ............ *A61B 17/0218* (2013.01); *A61B 2017/00367* (2013.01); *A61B 2017/0243* (2013.01); *A61B 2017/306* (2013.01)

(58) Field of Classification Search
CPC .. A61B 2017/00407; A61B 2017/0237; A61B 2017/0243
See application file for complete search history.

(56) References Cited

U.S. PATENT DOCUMENTS 5,372,124 A * 12/1994 Takayama .............. A61B 10/06
606/127
5,797,900 A * 8/1998 Madhani ................ A61B 34/30
606/1

(Continued)

FOREIGN PATENT DOCUMENTS

JP 2016-152939 A 8/2016
JP 2019-063550 A 4/2019

OTHER PUBLICATIONS

PCT International Search Report and Written Opinion, Application No. PCT/US2021/57833, dated Jan. 28, 2022.

(Continued)

*Primary Examiner* — Nicholas W Woodall
(74) *Attorney, Agent, or Firm* — Fish & Richardson P.C.

(57) ABSTRACT

A reconfigurable tool carries suction pods adapted for robotic surgery wherein a distal end with the suction pods is insertable through a small port incised in a living body to reach a working space for performing cardiac repairs. The tool has an articulating hub with a base part and a sliding part, wherein the suction pods pivot from the sliding part. The base part has a keyed surface configured to interlock with a keyed surface of the pods. A pullcord for retracting the suction pods toward a support tube of the tool has a loosened state wherein the first and second keyed surfaces can be spaced apart so that the suction pods can be spread for grasping a tissue to be stabilized at desired locations. The pullcord has a tightened state wherein the first and second keyed surfaces are interlocked so that the suction pods are inhibited from pivoting.

8 Claims, 13 Drawing Sheets

(56) References Cited

U.S. PATENT DOCUMENTS

| | | | |
|---|---|---|---|
| 5,971,976 A | 10/1999 | Wang et al. | |
| 5,984,864 A * | 11/1999 | Fox | A61B 90/57 |
| | | | 600/201 |
| 6,113,534 A * | 9/2000 | Koros | A61B 17/02 |
| | | | 600/213 |
| 6,206,903 B1 * | 3/2001 | Ramans | A61B 17/29 |
| | | | 606/205 |
| 6,398,726 B1 | 6/2002 | Ramans et al. | |
| 6,436,107 B1 | 8/2002 | Wang et al. | |
| 6,459,926 B1 | 10/2002 | Nowlin et al. | |
| 6,468,265 B1 | 10/2002 | Evans et al. | |
| 6,511,416 B1 * | 1/2003 | Green, II | A61B 17/02 |
| | | | 600/37 |
| 6,659,939 B2 | 12/2003 | Moll et al. | |
| 6,699,177 B1 | 3/2004 | Wang et al. | |
| 6,743,169 B1 | 6/2004 | Taylor et al. | |
| 6,764,445 B2 * | 7/2004 | Ramans | A61B 34/71 |
| | | | 600/235 |
| 6,817,972 B2 | 11/2004 | Snow | |
| 6,860,877 B1 | 3/2005 | Sanchez et al. | |
| 6,936,001 B1 | 8/2005 | Snow | |
| 7,101,363 B2 * | 9/2006 | Nishizawa | A61B 34/71 |
| | | | 606/1 |
| 7,217,240 B2 | 5/2007 | Snow | |
| 8,317,074 B2 * | 11/2012 | Ortiz | A61B 17/115 |
| | | | 227/176.1 |
| 8,523,900 B2 * | 9/2013 | Jinno | A61B 34/37 |
| | | | 606/208 |
| 8,600,551 B2 | 12/2013 | Itkowitz et al. | |
| 8,870,900 B2 * | 10/2014 | Julian | A61B 34/71 |
| | | | 128/898 |
| 9,119,654 B2 | 9/2015 | Ramans et al. | |
| 9,724,162 B2 * | 8/2017 | Crainich | A61B 34/30 |
| 10,064,679 B2 * | 9/2018 | Münnig | A61B 34/71 |
| 10,631,886 B2 * | 4/2020 | Lee | A61B 17/00234 |
| 10,639,114 B2 * | 5/2020 | Schuh | A61B 34/37 |
| 10,639,116 B2 * | 5/2020 | Hibner | A61B 17/00234 |
| 10,695,141 B2 * | 6/2020 | Lee | A61B 17/29 |
| 10,751,140 B2 * | 8/2020 | Wallace | A61B 34/71 |
| 11,399,905 B2 * | 8/2022 | Schuh | A61B 34/71 |
| 11,628,028 B2 * | 4/2023 | Penny | B21D 39/00 |
| | | | 606/130 |
| 12,144,537 B2 * | 11/2024 | Traina | A61B 34/71 |
| 2001/0023311 A1 * | 9/2001 | Snow | A61B 17/02 |
| | | | 600/37 |
| 2003/0158463 A1 | 8/2003 | Julian et al. | |
| 2004/0082837 A1 | 4/2004 | Willis | |
| 2004/0167549 A1 | 8/2004 | Boone et al. | |
| 2005/0015013 A1 * | 1/2005 | Greszler | A61B 17/02 |
| | | | 606/151 |
| 2012/0078061 A1 | 3/2012 | Calafiore et al. | |
| 2025/0025146 A1 * | 1/2025 | Tsubouchi | A61B 17/0206 |

OTHER PUBLICATIONS

Extended European Search Report in European Appln No. 21889955.7, dated Apr. 26, 2024, 9 pages.

* cited by examiner

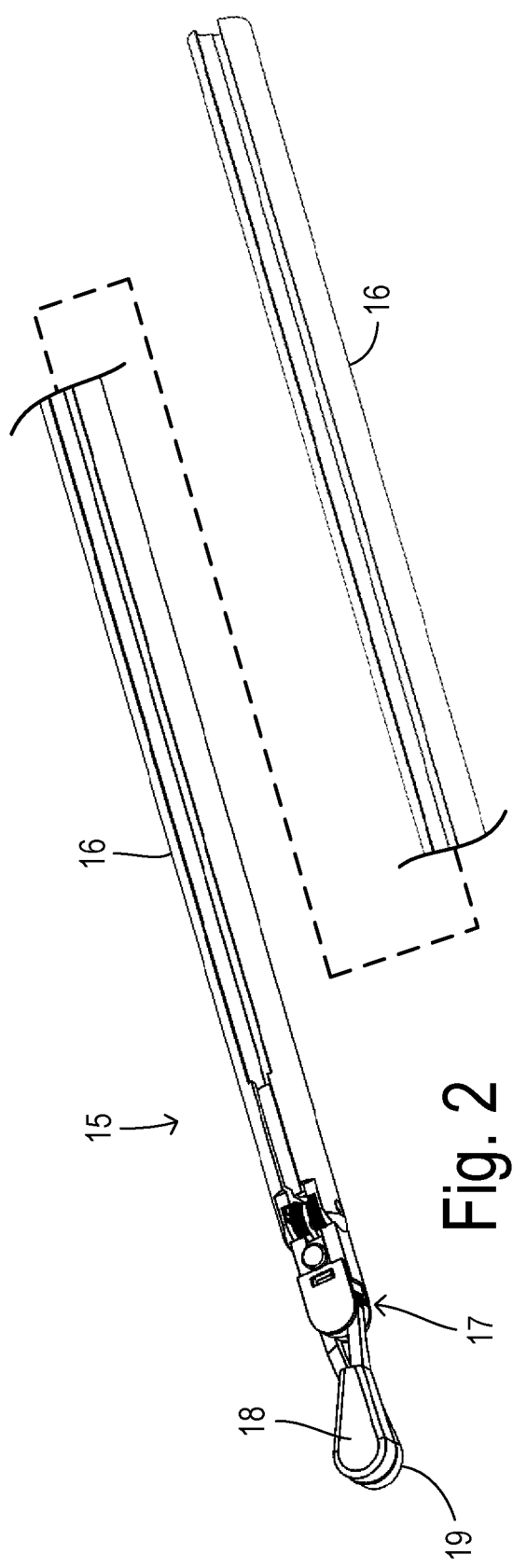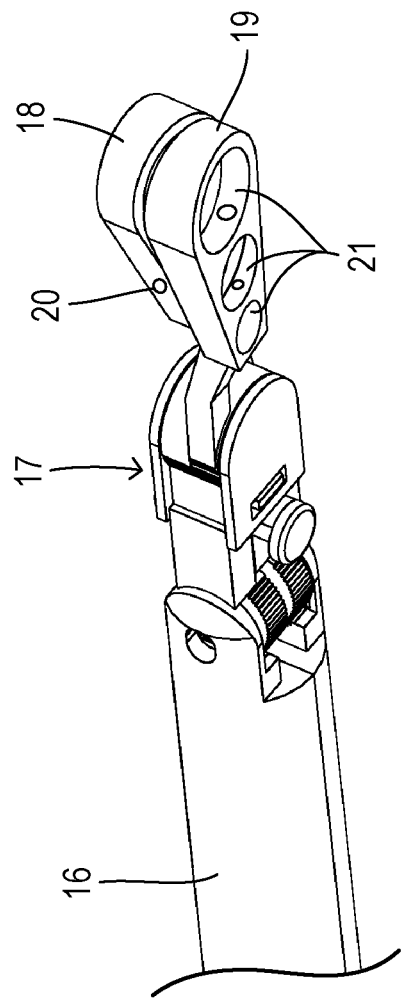

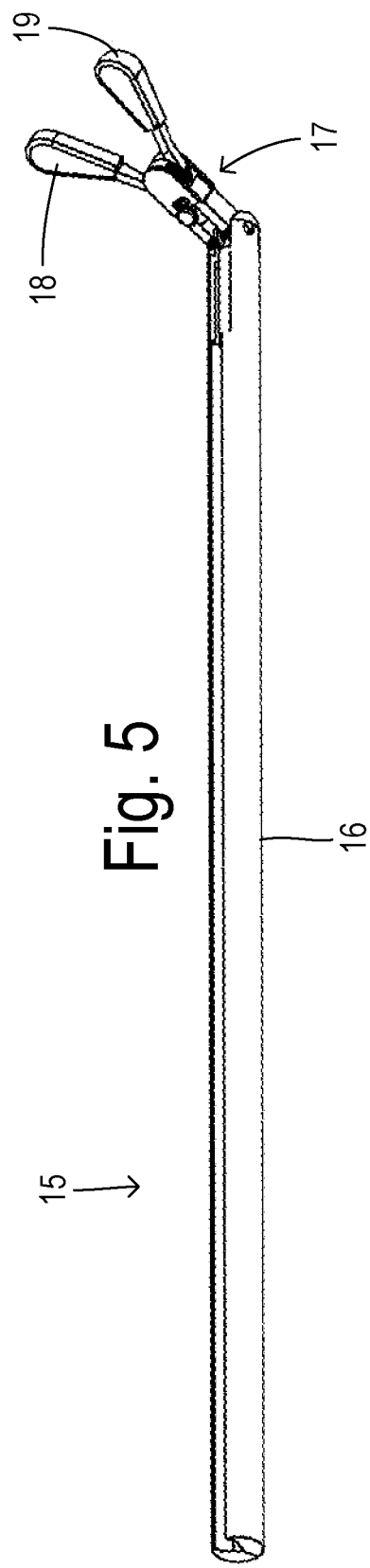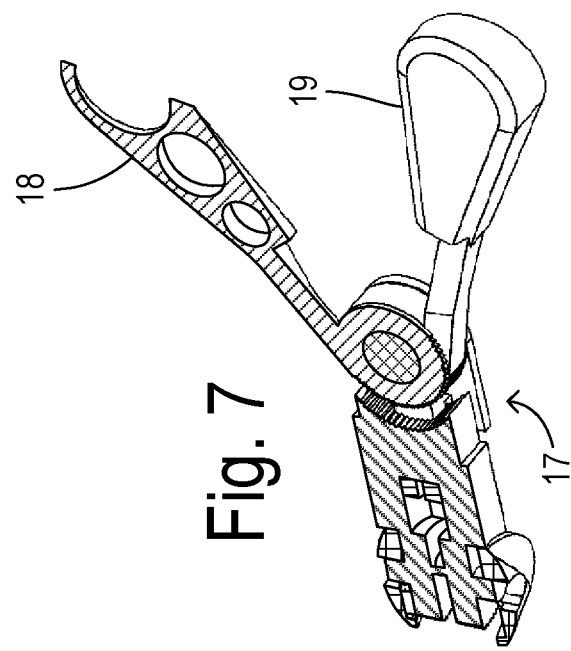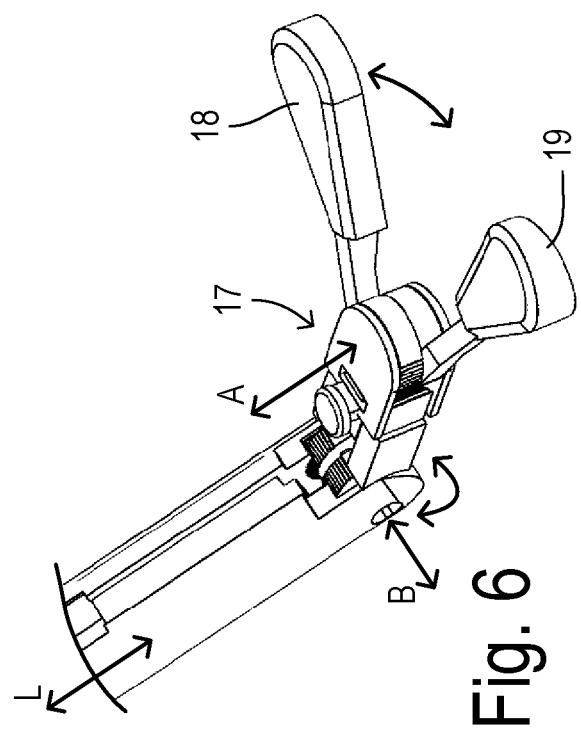

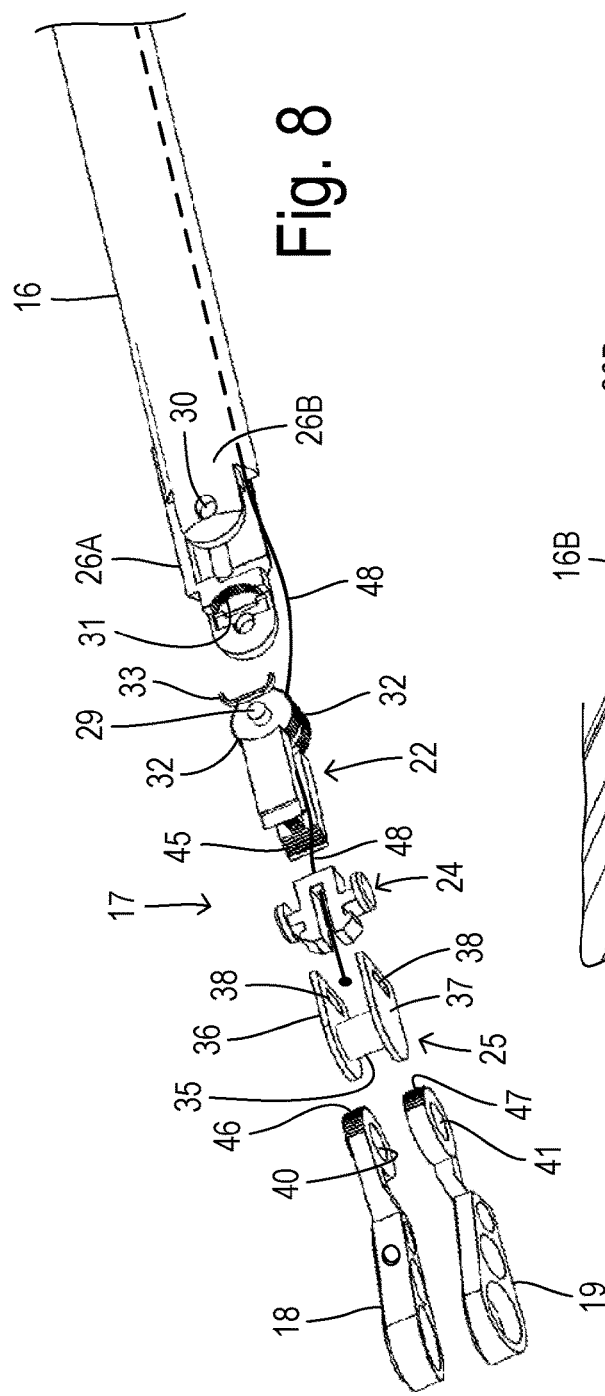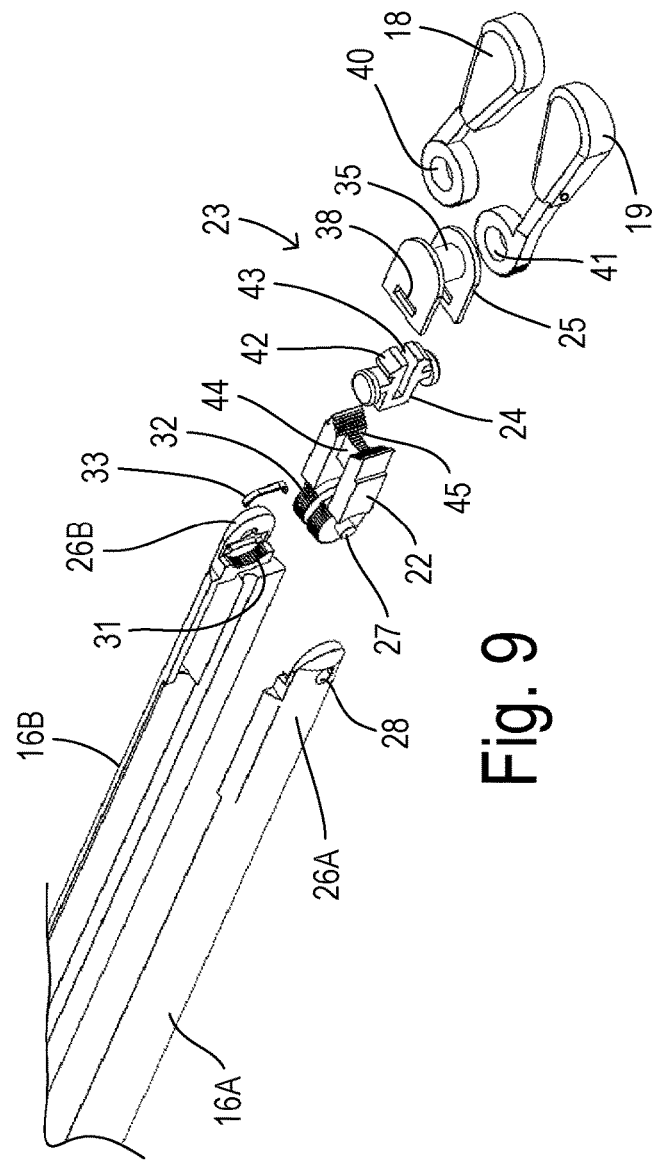

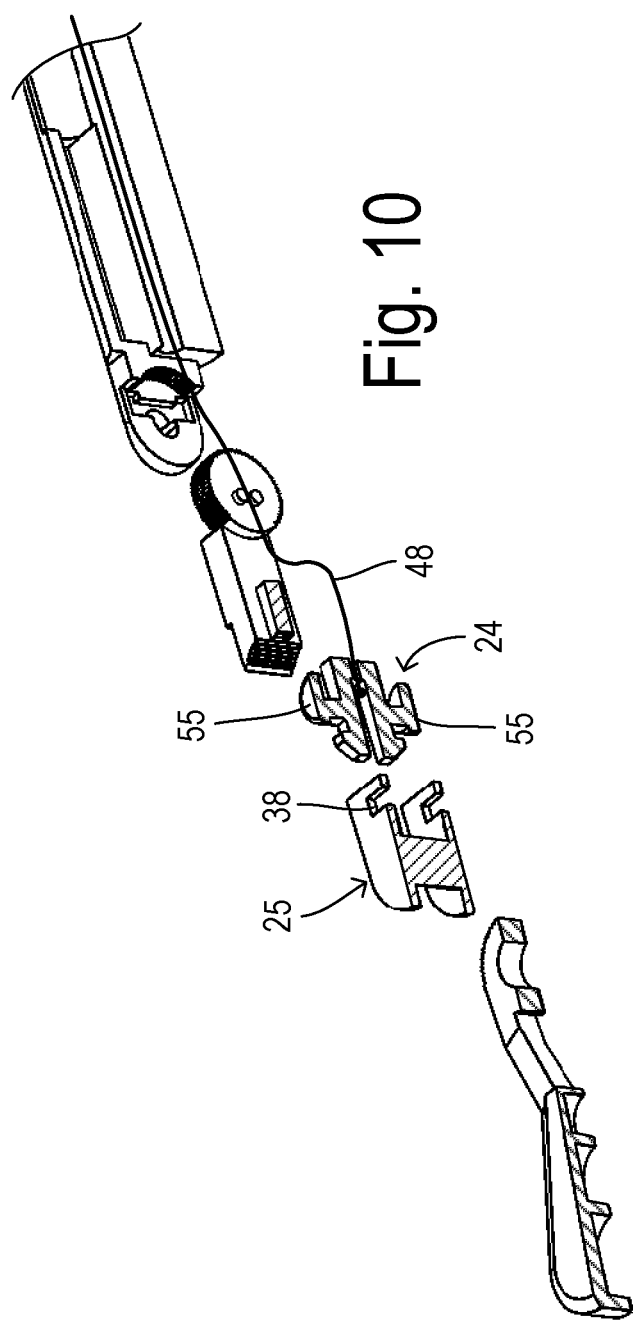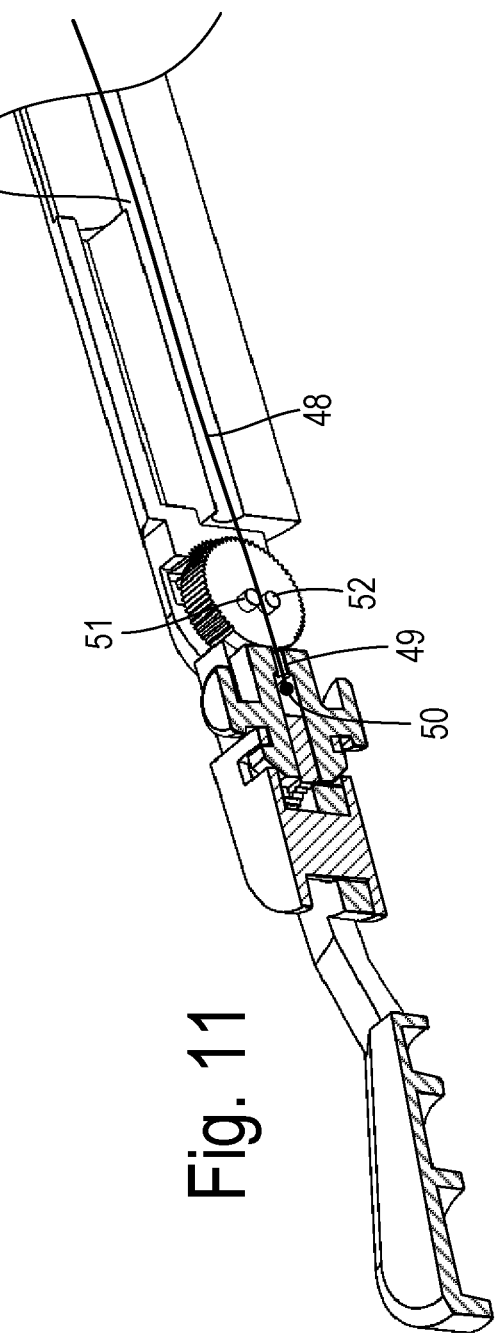

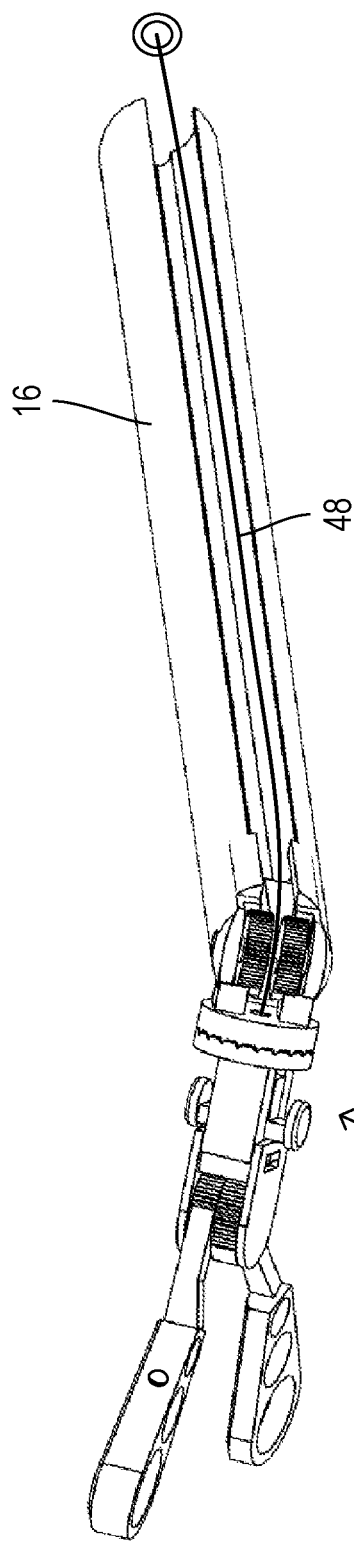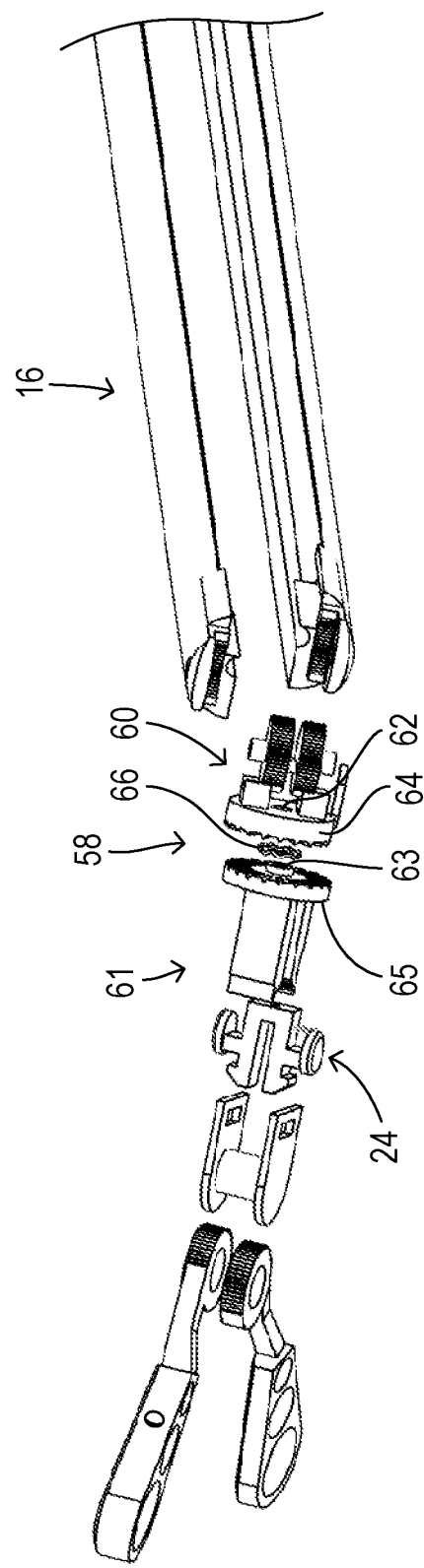

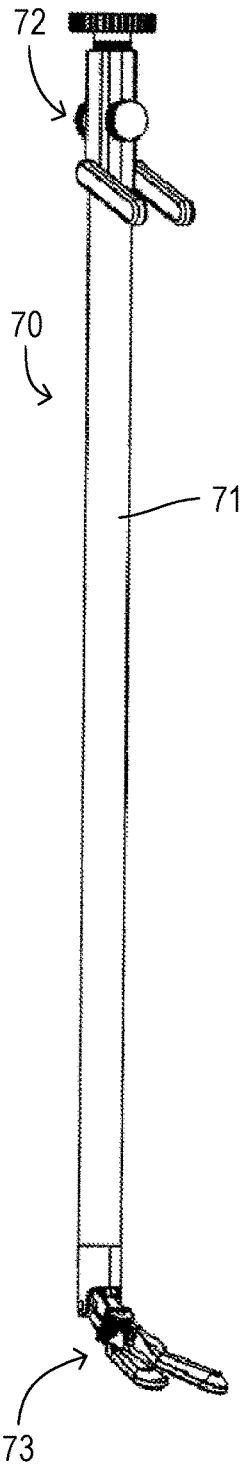
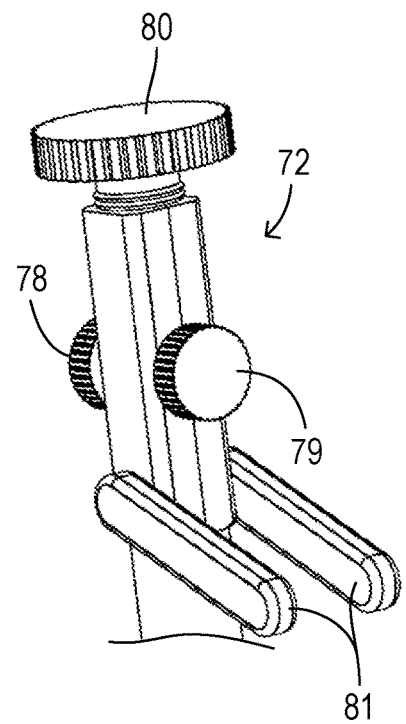
Fig. 18
Fig. 17
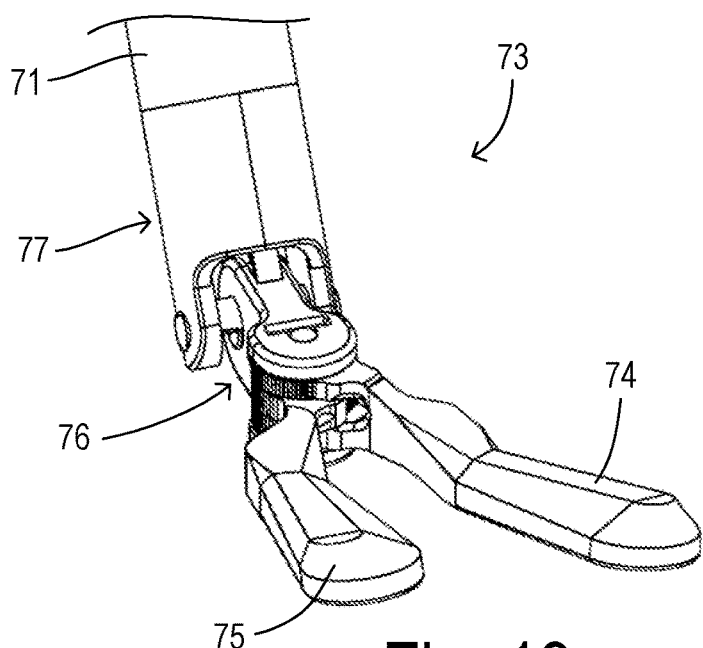
Fig. 19

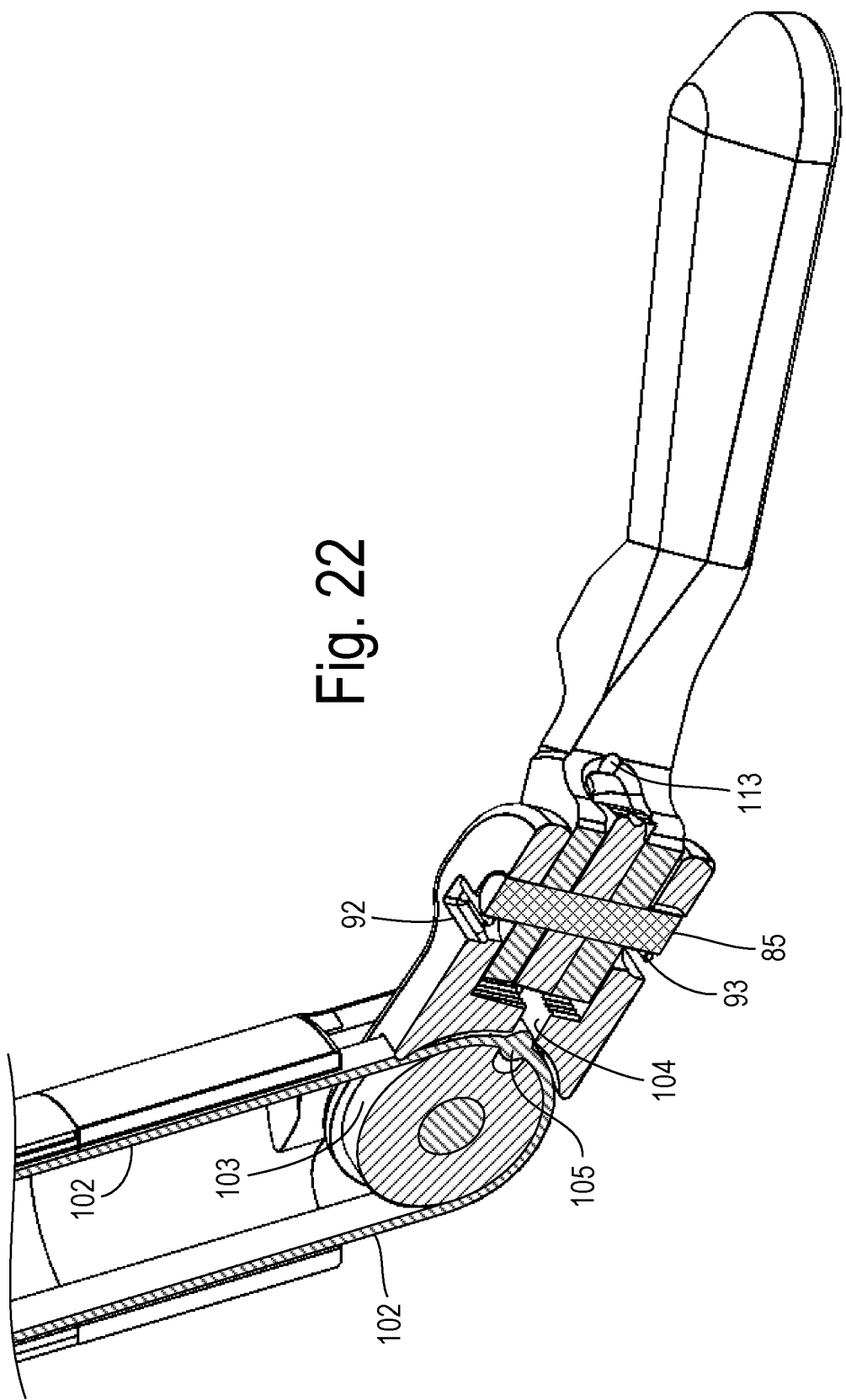

STABILIZER TOOL FOR TOTAL ENDOSCOPIC CORONARY ARTERY BYPASS

BACKGROUND OF THE INVENTION

The present invention relates generally to a tool for cardiac/thoracic surgery, and more specifically to a stabilization tool to restrain/stabilize a coronary area to enable anastomosis in or around a beating heart. By enabling parts of the tool to be reconfigured and/or assembled in situ, the parts of the tool are adapted to pass through small incisions/tunnels of the type typically used in robotically-controlled surgeries.

The invention is especially useful for coronary bypass known as OPCABG (Off Pump Coronary Artery Bypass Grafting). OPCABG had typically been performed using a sternal procedure such as an open chest cavity, but more recently robotic surgery has become more common which can be done through small incision holes with a robotic arm.

The use of minimally-invasive cardiac surgery (MICS) has become a prominent method for performing cardiac repair, in order to avoid the need for open chest procedures requiring long incisions and severing of the breastbone. A working space for MICS may be created within a chest space using one or more small incisions, sometimes with $CO_2$ gas introduction to expand the chest space, the use of a lift winch type retractor (e.g., the Medtronic ThoraTrak™ retractor system which uses a wire and winch mechanism to pull up a chest from outside), or (in the case of mitral valve repair) a retractor blade pulled up by a shaft through a chest wall (e.g., as with the AtriCure Atrial Lift System).

One particular type of MICS is known as total endoscopic coronary artery bypass (TECAB) which may be performed through four to five small slits (i.e., ports) for entry by several robotically controlled instruments and other support devices into the coronary region (see FIG. 11). The da Vinci® Surgical System from Intuitive Surgical, Inc., is one example of a robotic system used for this type of closed-chest operation.

A robotic system includes robotic arms that are manipulated by the surgeon. The robotic system may also include a camera, cutting tools, grasping tools, and suturing tools, for example. Preferably, surgery may be performed as the heart continues to beat, so that no heart-lung bypass machine is required. With the heart beating, it becomes desirable to restrain or stabilize the area around the heart. In order to obtain a highly effective stabilization, stabilizer members having suction for adhering to the surface to be stabilized may be preferred. A support member for the tool members contacting the stabilized region must be able to achieve a sufficiently small profile to be inserted to a desired placement and then also be sufficiently rigid to restrain the beating movements of the heart. It has been very difficult to insert stabilization tools of appropriate dimensions and with suction capability into the small holes used in TECAB and other procedures. In particular, a cardiac stabilizer tool for stabilizing an area for anastomosis needs to go through a small hole (e.g., about 12 mm) in order to be deployed inside of the body. Examples of prior art procedures and tools are shown in U.S. Pat. Nos. 6,936,001 and 8,870,900, which are incorporated herein by reference.

SUMMARY OF THE INVENTION

The present invention achieves these objectives by providing a reconfigurable, elongated tool which carries a suction holding mechanism adapted for robotic surgery and port surgery (e.g., small hole surgery with a manually inserted long shaft tool).

In one aspect of the invention, a stabilizer configured for use in minimally invasive cardiac surgery comprises a support tube extending from a proximal end to a distal end, wherein the distal end is adapted for insertion through an incised hole to a working space within a patient. An articulating hub is mounted to the distal end of the support tube, wherein the articulating hub has a proximal end that pivots at the distal end of the support tube around a first axis substantially tranverse to a longitudinal axis of the support tube. A pair of suction arms are mounted to the articulating hub at a distal end of the articulating hub, wherein the suction arms are configured to attach to a source of vacuum pressure. The suction arms are configured to adhere to a tissue surface of the patient when receiving the vacuum pressure. The suction arms are configured to pivot at the distal end of the articulating hub in a common plane, and the suction arms have a first keyed surface at their proximal ends. A pullcord is coupled to the suction arms and extends through the support tube from the suction arms to the proximal end. The articulating hub is comprised of a base part and a sliding part, wherein the suction arms are mounted to the sliding part. The base part has a second keyed surface configured to interlock with the first keyed surface. The pullcord has a loosened state wherein the first and second keyed surfaces can be spaced apart so that the suction arms can be spread for grasping the tissue. The pullcord has a tightened state wherein the first and second keyed surfaces are interlocked so that the suction arms are inhibited from pivoting.

BRIEF DESCRIPTION OF THE DRAWINGS

FIG. 2 is a perspective view of a first embodiment of a stabilizer tool in a closed profile state.

FIG. 4 is a perspective view of the stabilizer tool of FIG. 2 showing the distal end in greater detail.

FIG. 5 is a perspective view of the stabilizer tool of FIG. 2 is an opened profile state.

FIG. 6 is a perspective view of the distal end of the stabilizer tool of FIG. 2 in the opened profile state.

FIG. 7 is a partial cross section of the stabilizer tool of FIG. 2 in the opened profile state.

FIG. 8 is a side perspective view of the stabilizer tool of FIG. 2.

FIG. 9 is an end perspective view of the stabilizer tool of FIG. 2.

FIG. 10 is a cross-sectional exploded view of the stabilizer tool of FIG. 2.

FIG. 11 is a cross-sectional view corresponding to FIG. 10 without being exploded.

FIG. 15 is a perspective view of the stabilizer tool of FIG. 14.

FIG. 16 is an exploded view of the stabilizer tool of FIG. 14.

FIG. 17 is a side view of a third embodiment of a stabilizer tool according to the present invention.

FIG. 18 is a perspective view of a proximal end of the stabilizer tool of FIG. 17.

FIG. 19 is a perspective view of a distal end of the stabilizer tool of FIG. 17.

FIG. 22 is a cross-section view of the distal end of the stabilizer tool of FIG. 17.

DETAILED DESCRIPTION OF PREFERRED EMBODIMENTS

Figure 1:
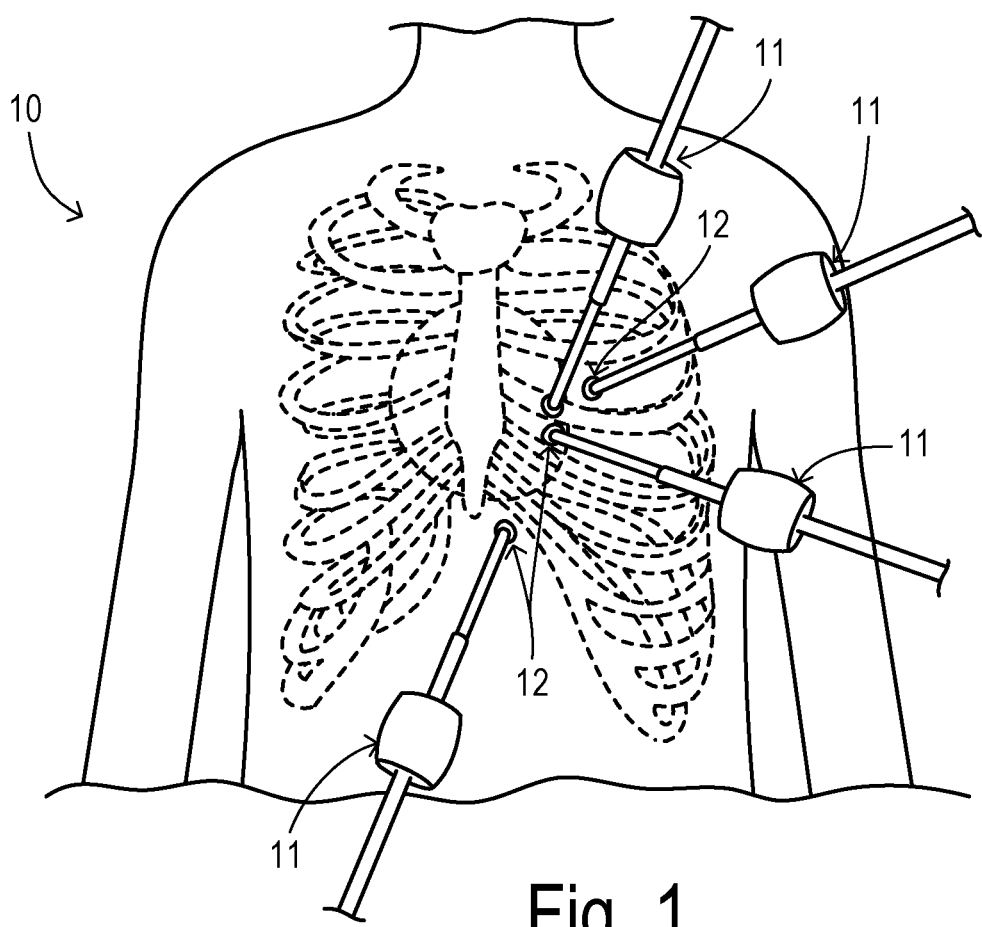
FIG. 1 is a schematic diagram showing deployment of instruments in multi-port cardiac surgery.
Figure 3:
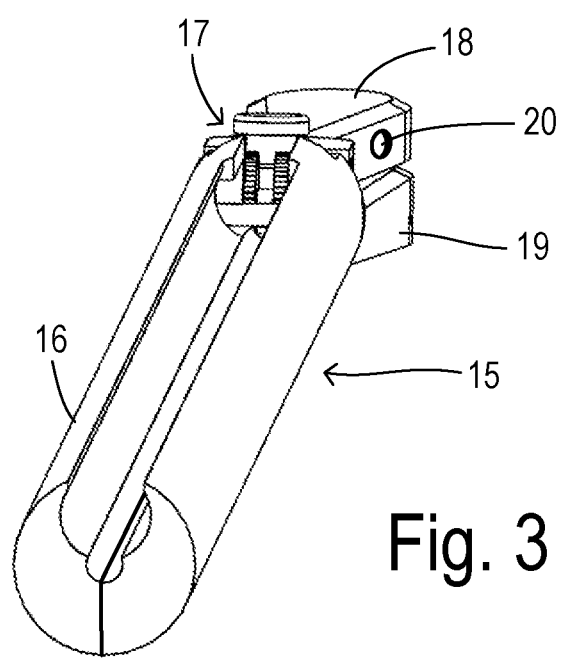
FIG. 3 is a proximal end view of the stabilizer tool of FIG. 2.

FIG. 1 shows a body 10 of a patient with multiple instruments 11 inserted via different respective incised holes 12 (i.e., tunnels or ports) to access an internal working space. The invention provides a stabilizing tool which is insertable as a single piece through a respective hole (e.g., through a side hole or side port in a lateral side of the patient's body).

A first embodiment of the invention is shown in FIGS. 2-13. A stabilizer tool 15 has a closed profile in FIGS. 2-4 with a support tube 16, an articulating hub 17, a suction arm 18, and a suction arm 19 arranged in a linear alignment to easily pass through the incised hole. Support tube 16 extends from a proximal end to a distal end. Articulating hub 17 is mounted to the distal end of the support tube. A proximal end of hub 17 pivots at the distal end of support tube 16 around an axis substantially tranverse to support tube 16. When in the closed profile, an outer envelope of the tool body will fit within a diameter of the incised hole (e.g., 12 mm), enabling the distal end and a support rod or shaft of the tool to be inserted into a chest cavity through the hole. A proximal end of the tool is configured to be attached to a patient table or other fixed structure by an articulate arm (e.g., an articulating and/or telescoping stabilizer arm that grasps the shaft and allows it to be moved and secured at an optimal position).

Suction arms 18 and 19 have suction pods at their distal ends and mounting pivots at their proximal ends. Suction tubing (not shown) can be connected to suction arms 18 and 19 either before or after the distal end of tool 15 has been inserted through the hole into the working space. Tubing receptacles (e.g., receptacle 20 in suction arm 18) are adapted to connect with the suction tubing and are in communication with openings in the suction pods (e.g., openings 21 in suction arm 19) to adhere to the tissue to be stabilized. Thus, the suction pods are coupled to a source of negative pressure (i.e., vacuum) by the suction tubing to generate suction at the openings which causes arms 18 and 19 to adhere to a tissue surface of the patient.

Stabilizer tool 15 has an opened profile shown in FIG. 5-7 with suction arms 18 and 19 pivoted apart and hub 17 angled transversely to support tube 16. Manipulation of the movable parts can be performed using other grasping instruments (e.g., forceps) inserted into the working space, or can be performed remotely from the proximal end (e.g., handle) of the support tube using internal wires or belts as described in another embodiment below.

In order to reach and hold (via suction) various target areas of a patient's anatomy in the working space, the invention uses hinge mechanisms to articulate the distal end components (e.g., suction arms 18 and 19 and hub 17). Suction arms 18 and 19 are pivotable on hub 17 around a common axis A, such that arms 18 and 19 are movable in a substantially common plane (transverse to axis A). Hub 17 is pivotable around an axis B which is substantially transverse to a longitudinal axis L of support tube 16. As explained in greater detail below, the hinge mechanisms may be associated with gear-like discs having teeth in order to lock them in a desired position. The teeth, serrations, or other keyed surfaces (e.g., any matching surfaces that resist sliding) prevent hinge rotation when the components are pressed together.

Referring to FIGS. 8-11, hub 17 includes a base part 22 and a sliding part 23 comprised of a yoke piece 24 and a link 25. The distal end of support tube 16 (which is comprised of two lateral sections 16A and 16B) forms receivers 26A and 26B. The proximal end of base part 22 has hinge posts 27 and 29 which are captured in pivot slots 28 and 30 formed in receivers 26A and 26B, respectively. Slots 28 and 30 are elongated in the longitudinal direction of support tube 16 to allow hinge posts 27 and 29 to slide. A spring 33 (e.g., leaf spring) is retained in receiver 26B at a position to bear against post 29 to urge base part 22 in a distal direction. Another spring (not shown) can be similarly arranged on receiver 26A to urge post 27 in the distal direction. Receivers 26A and 26B further define a keyed surface 31 (e.g., a toothed concave surface) which is formed complementary to, and mates with, a keyed surface 32 at the proximal end of base part 22 (e.g., a toothed gear wheel shape). Spring 33 normally keeps surfaces 31 and 32 spread apart, but when surfaces 31 and 32 are engaged then pivoting of base part 22 is inhibited.

Link 25 includes a pivot pin 35 extending between side plates 36 and 37. The proximal ends of suction arms 18 and 19 include pivot holes 40 and 41 which receive pivot pin 35. Yoke piece 24 has upper and lower tabs 42 and a slot 43 between tabs 42. Yoke piece 24 is installed on base part 22 so that a beam 44 of base part 22 is slidably captured in slot 43 (see FIG. 11). Tabs 42 are captured in slots 38 of link 25 so that yoke piece 24 and link 25 slide together as a unit on base part 22 between a distal position and a proximal position. A keyed surface 45 (e.g., a toothed concave surface) is provided on the distal end of base part 22 which is formed complementary to, and mates with, keyed surfaces 46 and 47 at the proximal ends of suction arms 18 and 19 (e.g., a toothed gear wheel shape). When suction arms 18 and 19 slide in the proximal direction toward base part 22 along with yoke piece 24 and link 25, keyed surfaces 46 and 47 engage keyed surface 45 so that the pivot positions of suctions arms 18 and 19 are locked in place. This gear-like mechanism uses two stacked gear wheel shaped portions which are allowed to rotate (i.e., pivot) simultaneously until the surfaces are locked together. This mechanism can optionally be applied at additional pivot points along each arm to increase flexibility of shaping the contact points on the tissue, if desired.

In order to retract hub 17 and suction arms 18 and 19 in the proximal direction, a pullcord 48 extends from the proximal end of the support tube through support tube 16 and base part 22 of hub 17 to couple with the sliding portion which includes suction arms 18 and 19. Pullcord 48 passes through an aperture 49 in yoke piece 24 (FIGS. 10 and 11). An end catch 50 formed as an enlargement or ball at the distal end of pullcord 48 is captured in slot 43 as a result of having a diameter larger than the diameter of aperture 49. The proximal end of base part 22 may include a gap between two toothed gear wheels which provide keyed surface 32, wherein the gap is bridged by guide pins 51 and 52. Pullcord 48 is threaded between guide pins 51 and 52 which helps keep pullcord 48 aligned with a central passage 53 in support tube 16. Pullcord 48 can be a wire made of metal, a string made of plastic or fabric, a glass fiber, or other material. Suction arms 18 and 19 can be coupled to pullcord 48 at the distal end via other components of the sliding structure as shown, or can be directly connected to a pullcord as described below. At the proximal end of pullcord 48 (not shown), a grip or handle may be provided with a securing mechanism so that a user can retract pullcord 48 once all the pivot positions have been appropriately set and it is desired to lock down the configuration with pullcord 48 in the tightened state. For example, tension in pullcord 48 can be controlled by a movable element (e.g., threaded anchor) in a handle at the proximal end of support tube 16.

Figure 12:
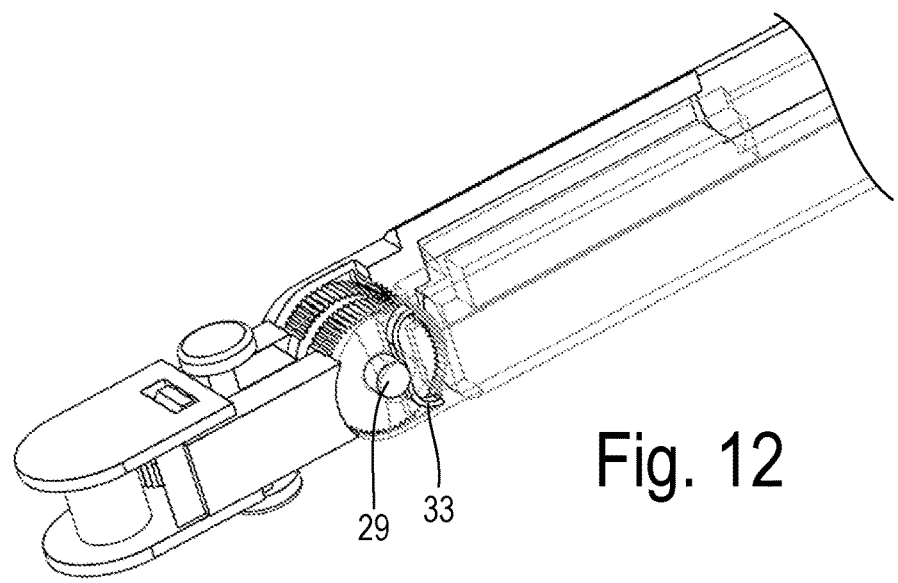
FIG. 12 is a perspective view of the articulating hub and support tube of the stabilizer tool of FIG. 2.
Figure 13:
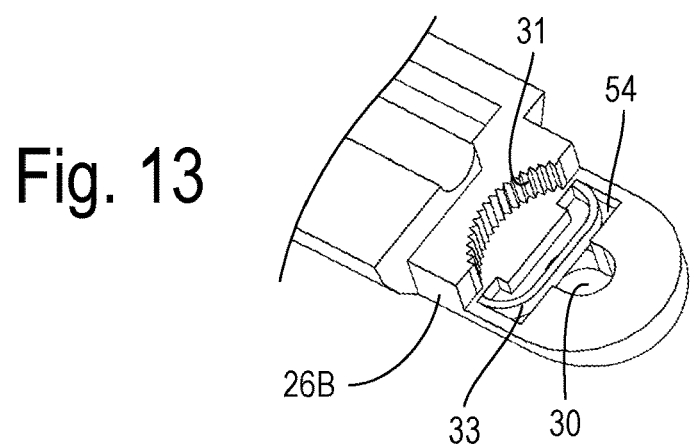
FIG. 13 is a perspective view of a portion of a receiver portion of the support tube of FIG. 2.

As shown in FIG. 12, upon release of pullcord 48 either to reconfigure the stabilizer position or to remove tool 15 from the body, spring 33 pushes hinge post 29 in the distal direction. FIG. 13 shows a recess 54 in receiver 26B which retains spring 33 at pivot slot 30 to urge post 29 in the distal direction. A similar spring (not shown) may also be provided between sliding part 23 and base part 22 to normally urge keyed surfaces 46 and 47 apart from keyed surface 45. With pullcord 48 in the loosened state, the keyed surfaces disengage and tool 15 can be reconfigured to another opened profile or restored to the closed profile.

Vacuum tubing (not shown) connects to each suction arm. The tubing may be bundled. The support tube can be made of stainless steel with the vacuum tubing being retained in the central passage of the support tube. The arrangement can be sealed to help maintain $CO_2$ pressurization in the chest cavity for maintaining the working space. Stabilizer tool 15 may include a disposable part and a reusable part. For example, the distal end of the tool which contacts the heart can use very thin silicone rubber tubing which tends to be difficult to clean and maintain sterility. A disposable part may be comprised of link 25 and suction arms 18 and 19. Removal of the disposable part can be obtained by releasing tabs 42 from slots 38. The release can be facilitated by push buttons 55 on yoke piece 24 (FIG. 10) which can be pushed from both sides so that the disposable unit will slide on or off.

Figure 14:
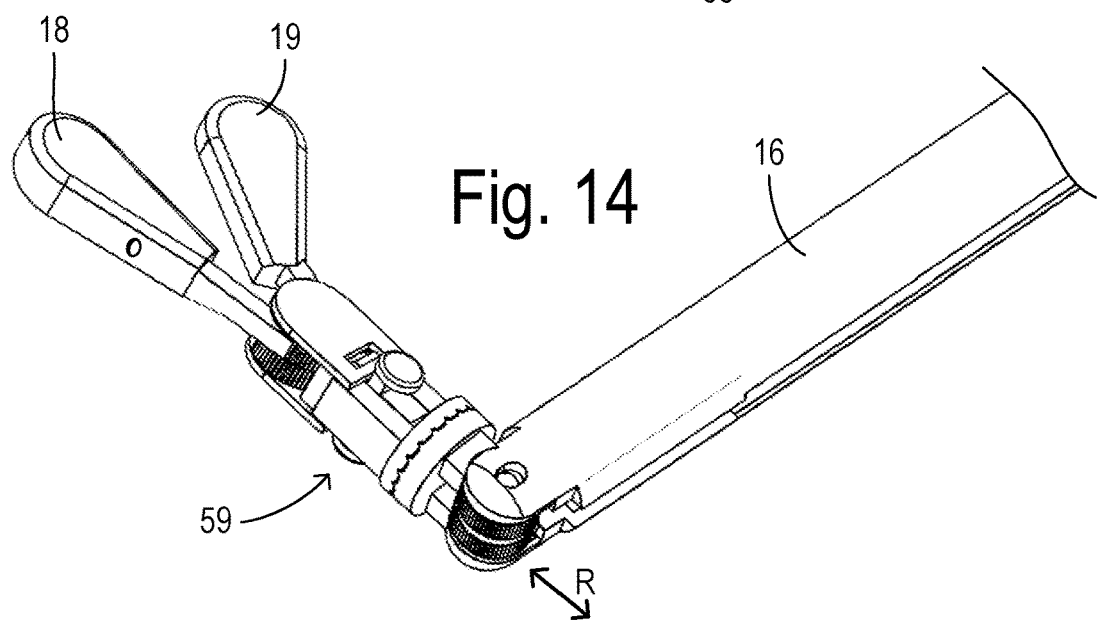
FIG. 14 is a perspective view of second embodiment of a stabilizer tool with an additional axis of motion, wherein the stabilizer tool is in an opened profile state.

FIGS. 14-16 show another embodiment wherein the hub provides another degree of freedom of movement, namely rotating (e.g. rolling) about its central longitudinal axis. A modified base part 58 of articulating hub 59 is comprised of a proximal subsection 60 and a distal subsection 61 having aligned longitudinal passages 62 and 63. Pullcord 48 passes through passages 62 and 63 to be captured in yoke piece 24 are previously described. Subsections 60 and 61 define a roll axis R. Proximal subsection 60 has a first plate 64 facing distal subsection 61 with a keyed (e.g., serrated) surface. Distal subsection 61 has a second plate 65 facing proximal subsection 60 with a keyed surface which is complementary to the keyed surface of plate 64. Distal subsection 61 is rotatable around the roll axis when pullcord 48 is in the loosened state, and is inhibited from rotating around roll axis R when pullcord 48 is in the tightened state. A spring 66 (e.g., wave spring) may be located between plates 64 and 65 to urge the keyed surfaces apart when pullcord 48 is in the loosened state, enabling free rotation until tension force is once again applied via pullcord 48 to compress spring 66 and lock the rotational motion.

Another embodiment of a stabilizer tool 70 is shown in FIGS. 17-27. As shown in FIG. 17, an elongated support tube 71 has a handle 72 at its proximal end and a grasping tool 73 at its distal end. As shown in FIG. 19, grasping tool 73 has suction arms 74 and 75 connected by an articulating hub 76 to a pivot mechanism 77 installed on the distal end of tube 71. As shown in FIG. 18, handle 72 has suction arm pivot adjustment knobs 78 and 79, suction arm locking knob 80, and hub pivot adjustment levers 81.

Figure 20:
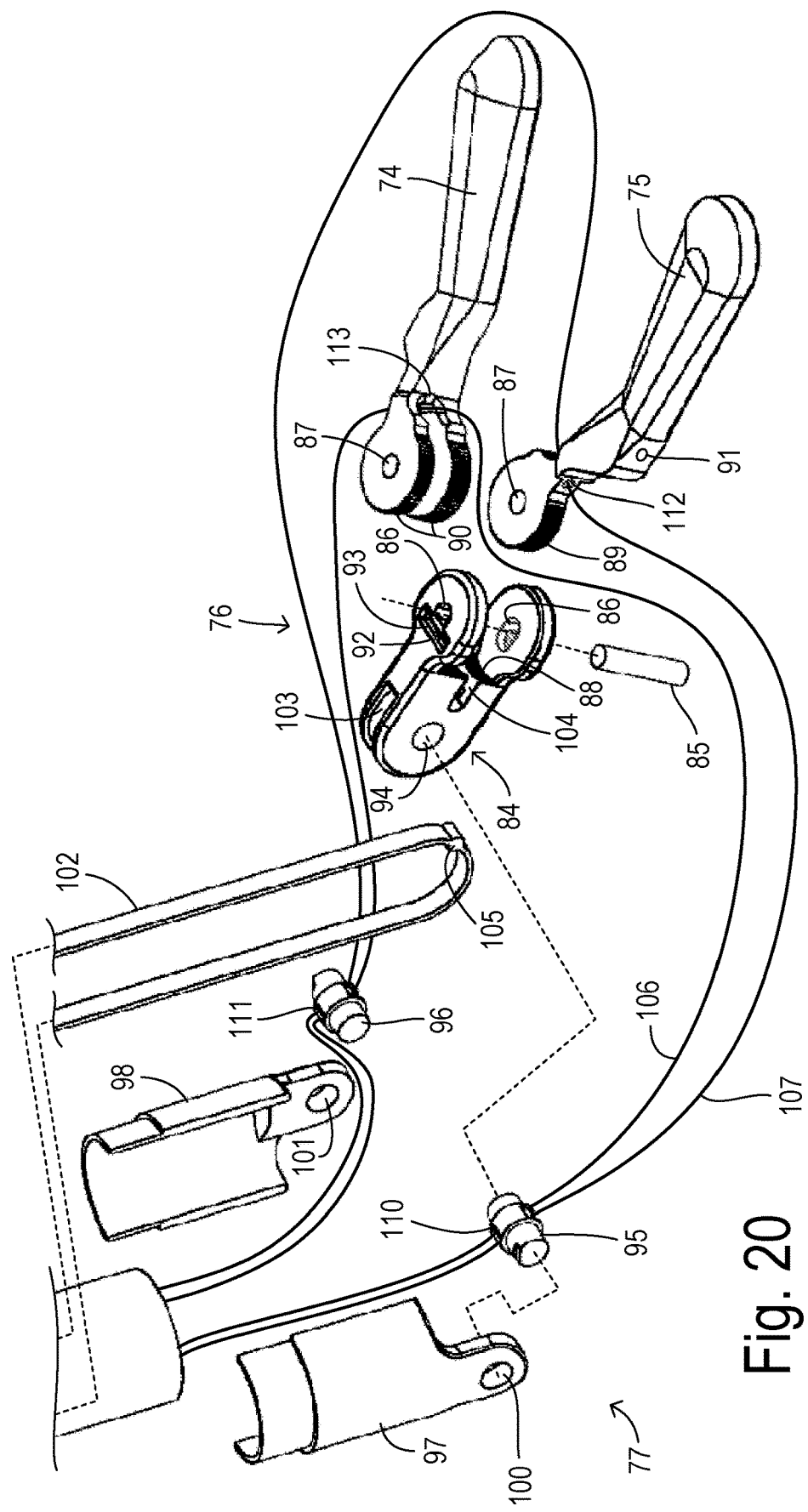
FIG. 20 is an exploded view of the distal end of the stabilizer tool of FIG. 17.

Referring to FIG. 20, hub 76 includes a base part 84 and a sliding part 85. Sliding part 85 is formed as a pivot shaft received in elongated pivot slots 86 of base part 84 and in pivot holes 87 of suction arms 74 and 75. Slots 86 are configured to allow sliding shaft part 85 to slide between a distal position in which suction arms 74 and 75 are pivotable around the axis of sliding shaft part 85 and a proximal position in which suction arms 74 and 75 are inhibited from pivoting due to the interlocking of a keyed surface 88 of base part 84 with keyed surfaces 89 and 90 of suction arms 75 and 74, respectively. For retention of the assembly, sliding shaft part 85 may be firmly attached (e.g., press fit) to one of suction arms 74 or 75 within one of pivot holes 87. A recess(es) in base part 84 adjacent to slot(s) 86 retains a spring 93 (e.g., leaf spring) for biasing sliding shaft part 85 toward the distal position. Suction arms 74 and 75 include suction tubing receptacles 91 for attaching suction tubing.

The proximal end of base part 84 has a pivot hole 94 which defines a pivot axis for hub 76 and which receives the inward ends of a pair of pivot pins 95 and 96 of pivot mechanism 77. Pivot mechanism 77 also has a pair of semi-cylindrical receiver members 97 and 98 which fit together to form a cylinder and inserted into support tube 71 at their proximal ends. The distals ends of members 97 and 98 include aligned pivot holes 100 and 101. The outward ends of pins 95 and 96 are captured in pivot holes 100 and 101, so that base part 84 is pivotable around the axis perpendicular to the longitudinal axis of tube 71. For controlling rotation of base part 84, a flexible drive belt 102 exits from tube 71 and is looped over a pulley track 103 which passes radially around pivot hole 94. So that drive belt 102 cannot slip in pulley track 103, a bulge 105 is formed in drive belt 102 which is captured in an internal slot 104 of base part 84.

For controlling movement of suction arms 74 and 75, respective pullcords 106 and 107 (e.g., wires) exit from tube 71 and are looped between openings 110 and 111 in pivot pins 95 and 96 (which keeps the pullcords in an orientation from which suction arms 74 and 75 can be pulled laterally around their pivot axes). In between pivot pins 95 and 96, pullcord 106 is affixed within a bore 113 through suction arm 74. In between pivot pins 95 and 96, pullcord 107 is affixed within a bore 112 through suction arm 75. Pullcords 106 and 107 are not slidable within bores 112 and 133. Since pullcords 106 and 107 are looped from handle 72 and anchored to suction arms 74 and 75, respectively, they can be pulled from one side or the other (i.e., rotated like a conveyor belt) to provide a translational motion which pivots the suction arms as desired. With pullcords 106 and 107 in the loosened state (i.e., the keyed surfaces are not engaged), suction arms 74 and 75 can pivot freely. Once a desired position of suction arms 74 and 75 is obtained, pullcords 106 and 107 are each pulled from both sides to provide the tightened state in which a force in the proximal direction applied to suction arms 74 and 75 slides shaft part 85 in the proximal direction within slots 86, causing keyed surfaces 89 and 90 to engage keyed surface 88.

Figure 21:
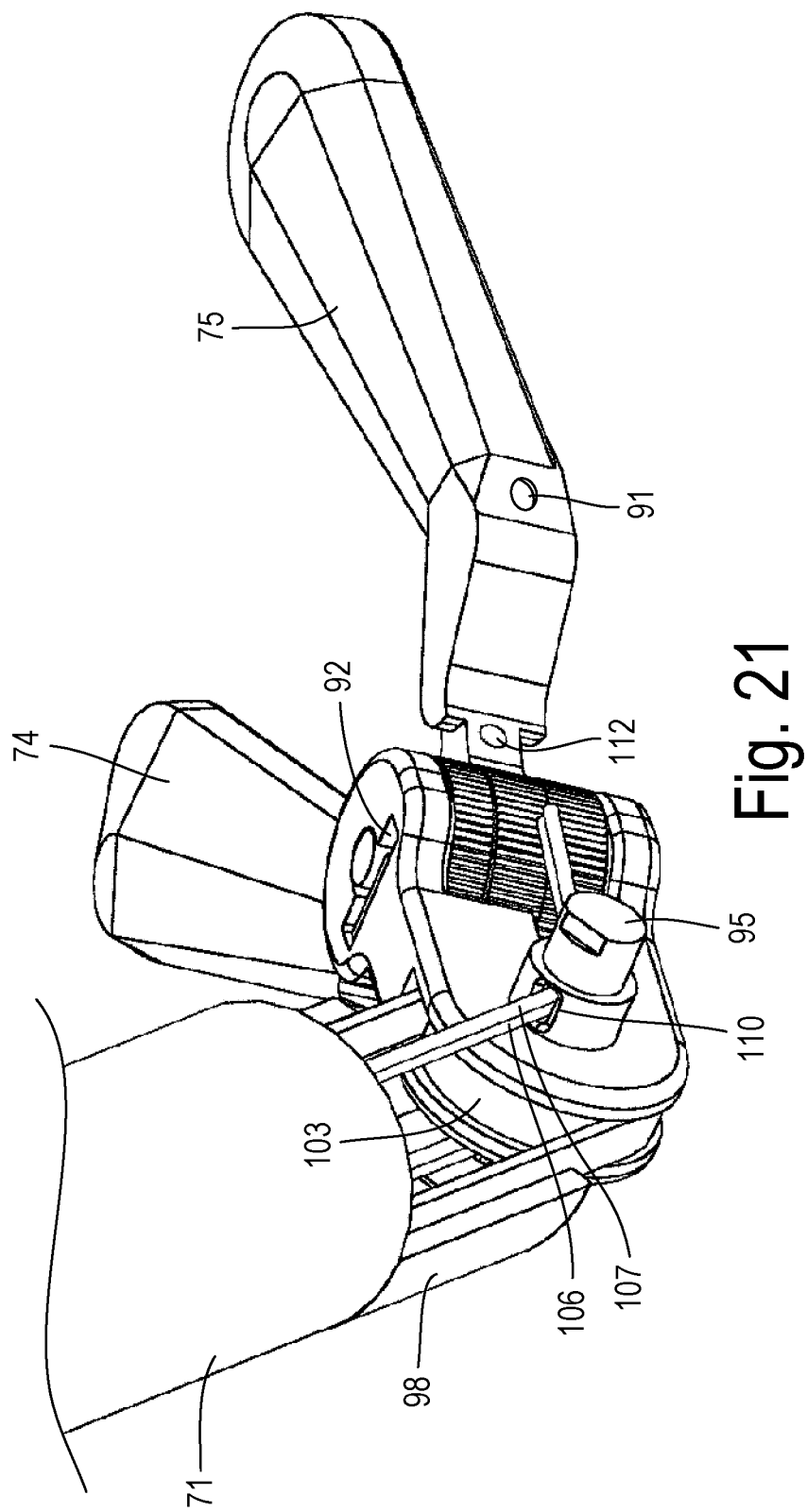
FIG. 21 is a perspective view of the distal end of the stabilizer tool of FIG. 17 in greater detail.
Figure 24:
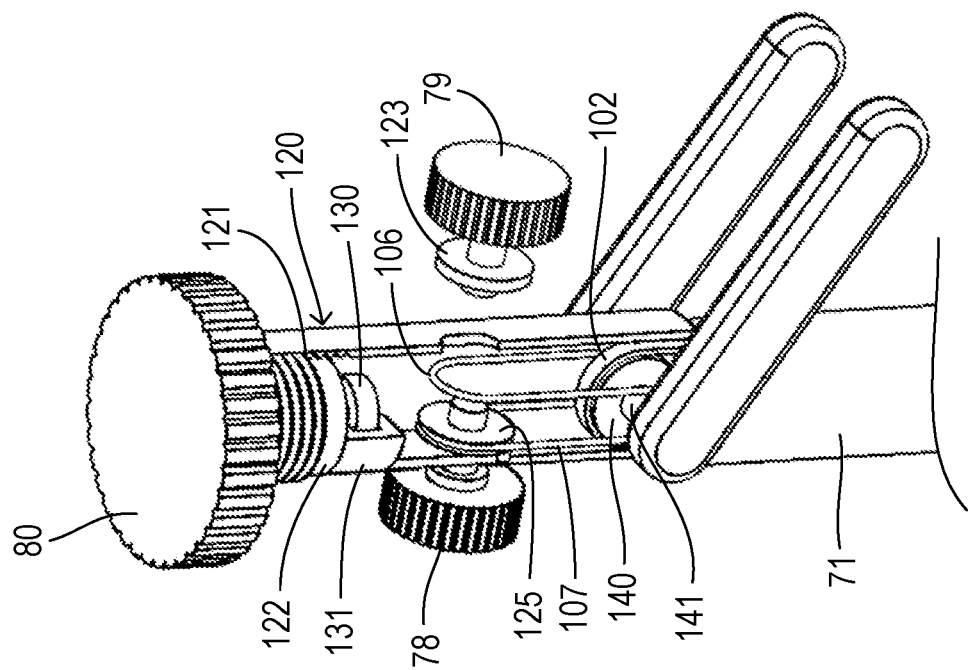
FIG. 24 is a partially exploded view of proximal end of the stabilizer tool of FIG. 17.
Figure 23:
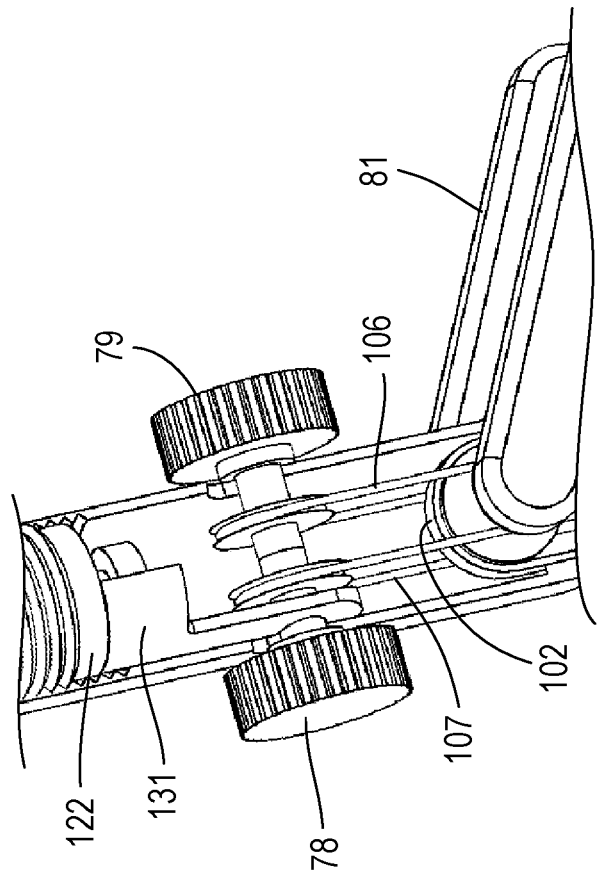
FIG. 23 shows a portion of the proximal end of the stabilizer tool of FIG. 17.
Figure 25:
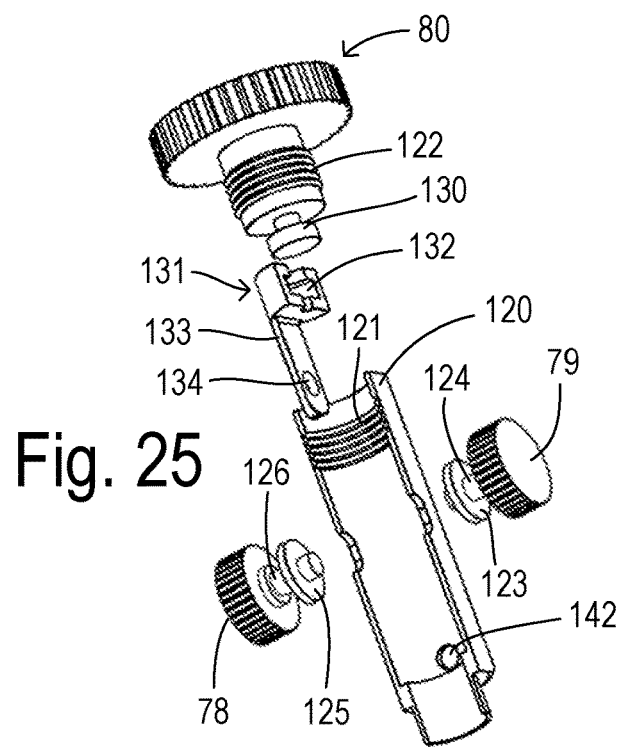
FIG. 25 is another exploded view of proximal end of the stabilizer tool of FIG. 17.
Figure 26:
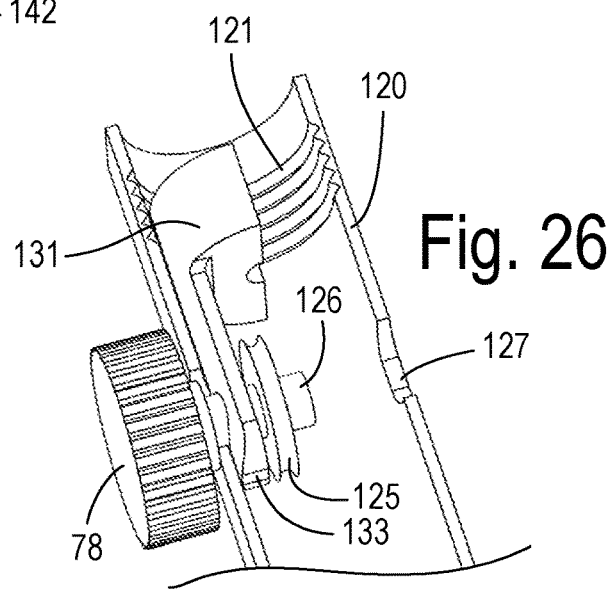
FIG. 26 is a perspective view showing a portion of a mechanism at the proximal end of the stabilizer tool of FIG. 17 for adjusting the pullcords.
Figure 27:
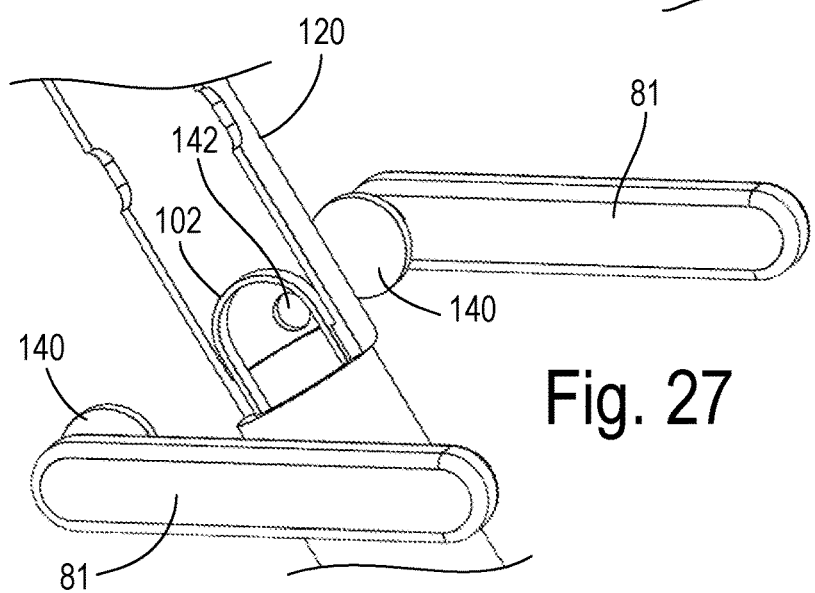
FIG. 27 is a partial, exploded view showing a portion of a mechanism at the proximal end of the stabilizer tool of FIG. 17 for adjusting the drive belt.

FIG. 21 shows pullcords 106 and 107 passing through opening 110 in pivot pin 95 (receiver member 97 is removed and a distal section of pullcords 106 and 107 are removed for clarity). Pullcord 107 continues on (not shown) for attachment in bore 112, while pullcord 106 instead continues on to suction arm 74. FIG. 22 shows the path of pulley track 103 and the capturing of bulge 105 in slot 104 in greater detail.

Handle 72 is shown in greater detail in FIGS. 23-27. A hollow tube 120 (e.g., formed of two semi-cylindrical members) fits onto support tube 71 and has a threaded opening 121 for receiving a threaded shaft 122 of locking knob 80. Suction arm adjustment knob 79 has a drive pulley 123 on a shaft 124, and suction arm adjustment knob 78 has a drive pulley 125 on a shaft 126. Hollow tube 120 defines side openings 127 which receive shafts 124 and 126. Openings 127 are elongated to allow shafts 124 and 126 to move longitudinally to change tension on the pullcords which are internally looped over pulleys 123 and 125. To control the longitudinal position of pulleys 123 and 125, yoke pieces 131 (only one of which is shown) define a pocket 132 for capturing a disk 130 projecting from a distal end of shaft 122. Pocket 132 has a round profile allowing disk 130 to rotate therein. Yoke piece 131 has a wing extension 133 with an aperture 134 for receiving shaft 126. Thus, by rotating knob 80 in the appropriate direction, the position of pulleys 123 and 125 can be shifted distally or proximally together in order to achieve the loosened or tightened state. While in the loosened state, adjustment knobs 78 and 79 can be rotated in order to pull a desired side of a corresponding pullcord in the proximal direction (i.e., in a translational motion) so that the attached suction arm pivots as desired.

For controlling pivoting of the articulating hub on which the suction arms are mounted, handle 72 includes adjustment levers 81 connected to a belt pulley 140 via a shaft 141 which passes through side openings 142 in tube members 120. Drive belt 102 is looped over pulley 140 so that rotational movement of levers 81 manually pivots the base part of the hub around its axis. Preferably, levers 81 and belt 102 are arranged so that when levers 81 are parallel with tube 71 then the hub is also parallel to tube 71. Belt pulleys 140 and pulley track 103 have substantially the same diameters. Thus, when the orientation angle of the hub and suction arms are adjusted, the orientation of levers 81 shares the same orientation and the user can easily determine the orientation of the suction arms inside the body.

In some embodiments, the interior of the support tube may have a C-shaped cross section in order to fit suction tubing. When the tubing is inserted, it may complete (i.e., completely fill) a circular section of the device to help prevent air leaks. The tool can have additional wires/strings to manipulate the articulation parts by push/pull actions. The tool may also be configured to have an additional flexible tubing and nozzle for blowing liquid (e.g., saline) for cleaning/clearing blood from around the anastomosis area.

What is claimed is:

1. A stabilizer for minimally invasive cardiac surgery comprising:
   a support tube extending from a proximal end to a distal end, wherein the distal end is adapted for insertion through an incised hole to a working space within a patient;
   an articulating hub mounted to the distal end of the support tube, wherein the articulating hub has a proximal end that pivots at the distal end of the support tube around a first axis substantially transverse to a longitudinal axis of the support tube;
   a pair of suction arms mounted to the articulating hub at a distal end of the articulating hub, wherein the suction arms are configured to attach to a source of vacuum pressure, wherein the suction arms are configured to adhere to a tissue surface of the patient when receiving the vacuum pressure, wherein the suction arms are configured to pivot at the distal end of the articulating hub in a common plane, and wherein the suction arms have a first keyed surface at their proximal ends; and
   a pullcord coupled to the suction arms and extending through the support tube from the articulating hub to the proximal end of the support tube;
   wherein the articulating hub is comprised of a base part and a sliding part, wherein the suction arms are mounted to the sliding part, wherein the base part has a second keyed surface configured to interlock with the first keyed surface;
   wherein the pullcord has a loosened state wherein the first and second keyed surfaces can be spaced apart so that the suction arms can be spread for grasping the tissue, and wherein the pullcord has a tightened state wherein the first and second keyed surfaces are interlocked so that the suction arms are inhibited from pivoting.

2. The stabilizer of claim 1 wherein the sliding part of the articulating hub comprises a pivot shaft, wherein the suction arms each has a proximal end with a pivot hole receiving the pivot shaft, and wherein a spring between the base part and the sliding part urges the first and second keyed surfaces apart when the pullcord is in the loosened state.

3. The stabilizer of claim 1 wherein the pullcord is a first pullcord which is affixed to a first one of the suction arms, wherein the stabilizer further comprises a second pullcord which is affixed to a second one of the suction arms, wherein each pullcord is looped between the respective one of the suction arms and the proximal end of the support tube, and wherein each pullcord is configured to provide a translational motion while in the loosened state to pivot the respective suction arm.

4. The stabilizer of claim 3 further comprising:
   first and second drive pulleys disposed at the proximal end of the support tube receiving the first and second pullcords;
   first and second control knobs coupled to the first and second drive pulleys, respectively, for manually imparting the translational motion; and
   a tension controller coupled to the drive pulleys movable along a longitudinal axis of the support tube to manually move the drive pulleys to obtain the loosened state and the tightened state.

5. The stabilizer of claim 1 wherein the base part of the articulating hub includes a pulley track radially disposed around the first axis, wherein the stabilizer further comprises:
   a drive belt disposed in the pulley track;
   a belt pulley disposed at the proximal end of the support tube receiving the drive belt; and
   an adjustment lever coupled to the belt pulley for manually pivoting the base part around the first axis.

6. The stabilizer of claim 1 wherein the distal end of the support tube includes a receiver configured to pivotably couple with the base part, wherein the proximal end of the base part has a third keyed surface, wherein the receiver has a fourth keyed surface, and wherein the third and fourth keyed surfaces interlock when the pullcord is in the tightened state to inhibit pivoting of the articulating hub around the first axis.

7. The stabilizer of claim 1 wherein the base part of the articulating hub is comprised of proximal and distal subsections having aligned longitudinal passages receiving the pullcord and defining a roll axis, wherein the proximal subsection has a first plate facing the distal subsection and having a fifth keyed surface, wherein the distal subsection has a second plate facing the proximal subsection and having a sixth keyed surface, wherein the distal subsection is rotatable around the roll axis when the pullcord is in the loosened state, and wherein the distal subsection is inhibited from rotating around the roll axis when the pullcord is in the tightened state.

8. The stabilizer of claim 7 further comprising a spring disposed between the proximal and distal subsections to urge the fifth and sixth keyed surfaces apart when the pullcord is in the loosened state.

\* \* \* \* \*